United States Patent [19]

Rozniecki

[11] Patent Number: 4,489,366
[45] Date of Patent: Dec. 18, 1984

[54] PORTABLE LIGHT-BEAM PROJECTOR LOCATING DEVICE, SYSTEM

[75] Inventor: Edward J. Rozniecki, Macomb, Mich.

[73] Assignee: The United States of America as represented by the Secretary of the Army, Washington, D.C.

[21] Appl. No.: 461,722

[22] Filed: Jan. 28, 1983

[51] Int. Cl.³ .............................................. F21V 21/26
[52] U.S. Cl. .................................... 362/270; 362/286; 362/345; 362/386; 362/429; 362/287; 362/372; 362/398; 362/432; 362/294; 362/368; 362/419; 362/310; 362/373; 362/427; 33/228; 340/556
[58] Field of Search ............ 340/501, 555, 556, 815.12, 340/815.14; 33/228; 362/18, 20, 213, 280, 281, 282, 286, 287, 289, 294, 372, 419, 427, 429, 432, 145, 253, 270, 275, 310, 345, 368, 373, 386, 398

[56] References Cited

U.S. PATENT DOCUMENTS

| | | | |
|---|---|---|---|
| 1,276,605 | 8/1918 | Winston | 362/286 |
| 2,137,446 | 11/1938 | Despatures | 362/213 X |
| 2,947,854 | 8/1960 | Lozeau | 362/213 X |
| 3,428,800 | 2/1969 | Levin et al. | 362/289 X |
| 4,034,259 | 7/1977 | Schoch | 362/20 X |
| 4,390,929 | 6/1983 | LaFiandra | 362/427 X |
| 4,413,312 | 11/1983 | Morkosky, Jr. | 362/287 X |

*Primary Examiner*—Peter A. Nelson
*Attorney, Agent, or Firm*—Peter A. Taucher; Gail S. Soderling; Robert P. Gibson

[57] ABSTRACT

A novel portable light beam projector device, related system apparatus, and attendant novel method for wide variety use in conjunction with military vehicles, to establish optimum placement of optical fire detection sensors relative to installation of the vehicle's fire suppression system. These inventions are similarly usable to novelly establish corresponding optimum placement of various optical type intrusion and/or fire-detection sensors to similarly protect various confidential areas including storage facilities and attendant personnel/equipment/data and the like whether of a military, industrial or commercial character.

Each light projector device has an adjustable tubular shroud to adjustably focus the light beam cone angle. The desired cone angle of the light beam is initially set by use of associated system apparatus including an associated light beam calibration chart and some optional projector support stands. The cone angle adjustment feature enables the user to essentially duplicate the corresponding normally invisible field-of-view of various types of optical sensors to be installed. The related system apparatus further includes a part-time or selectively usable angularly adjustable bracket determining device for sensor installations requiring angular disposition relative to a vertical or horizontal structural component.

The inventions hereof greatly simplify, expedite, and assure highly accurate installations by eliminating the unsatisfactory former highly empirical character thereof, and large wasteful costs associated with the former practices.

8 Claims, 14 Drawing Figures

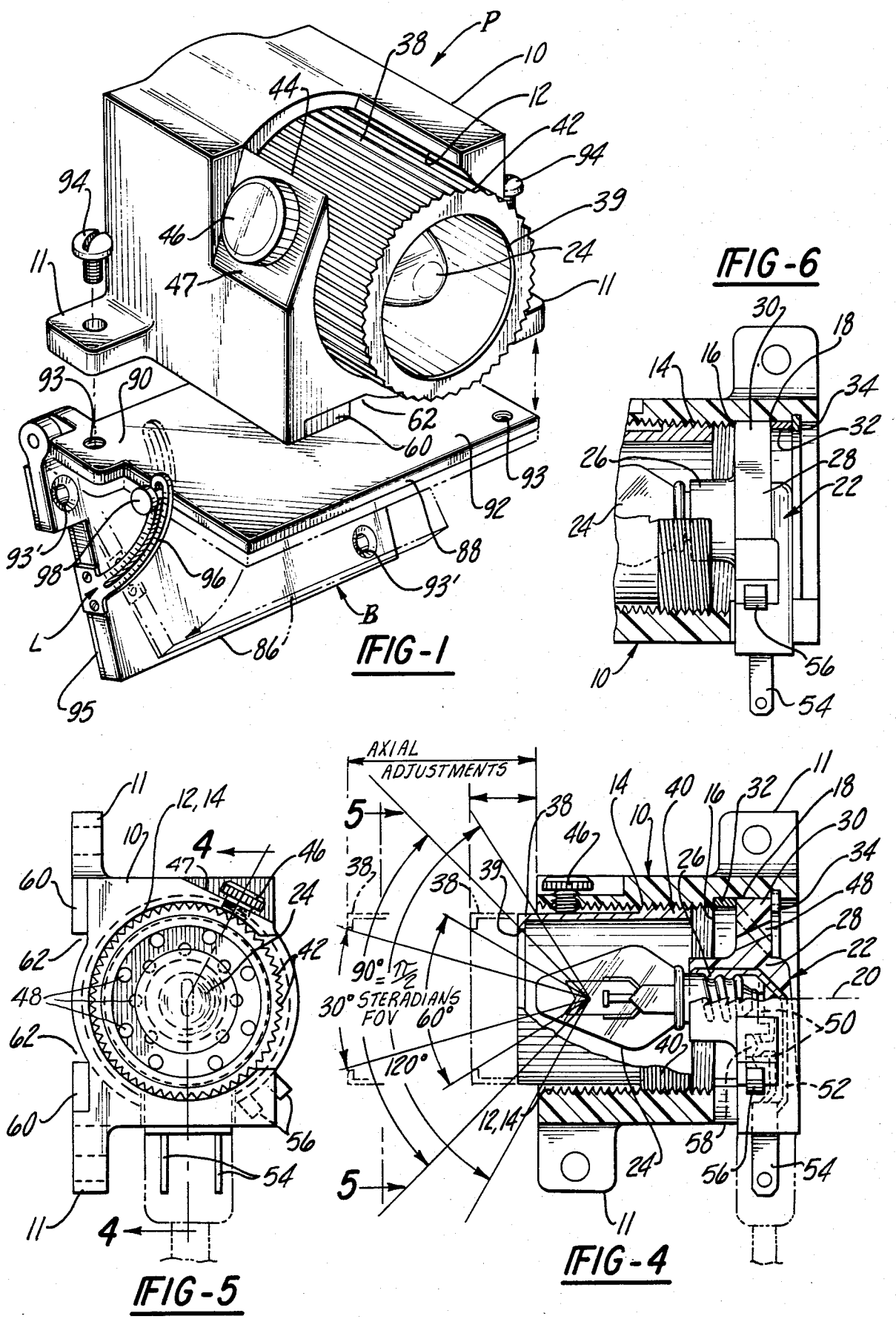

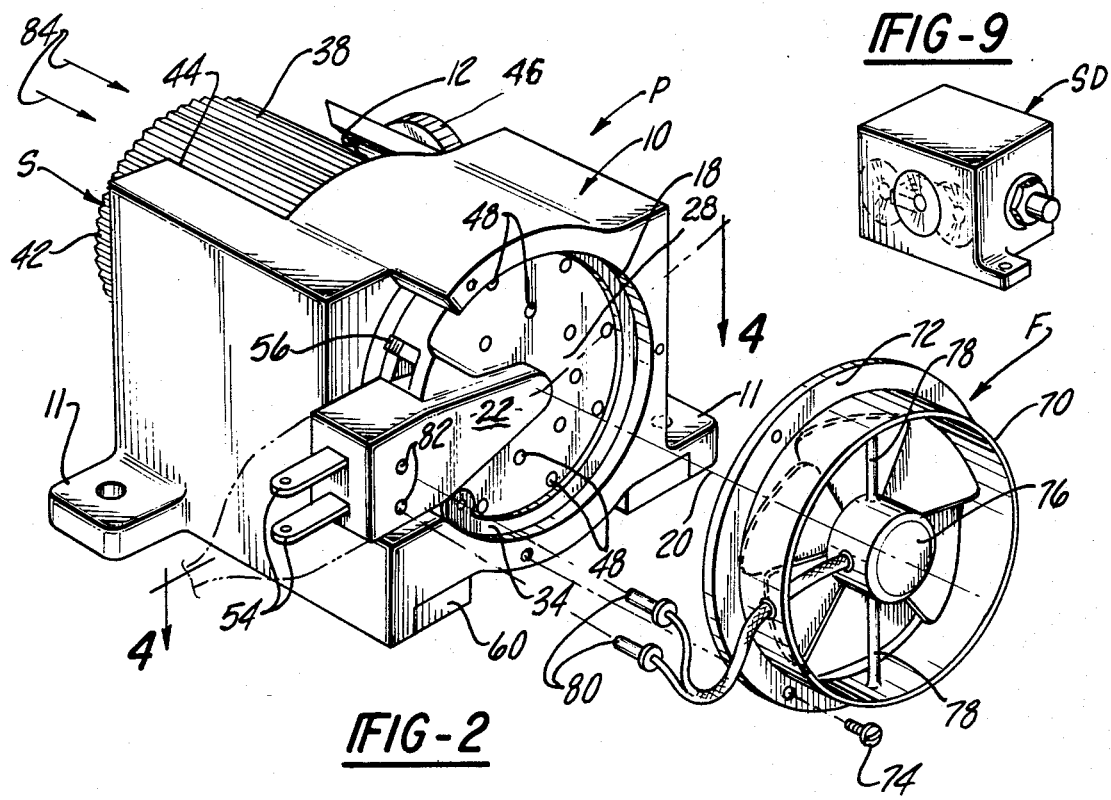
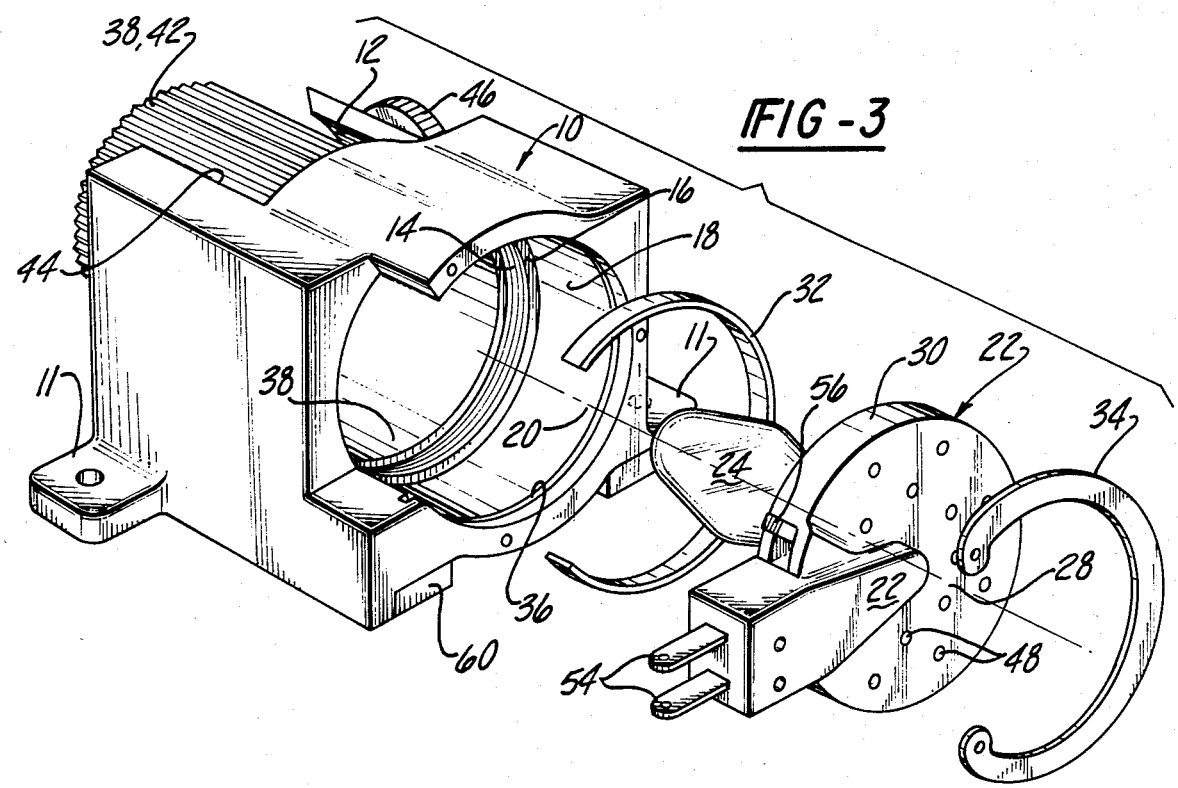

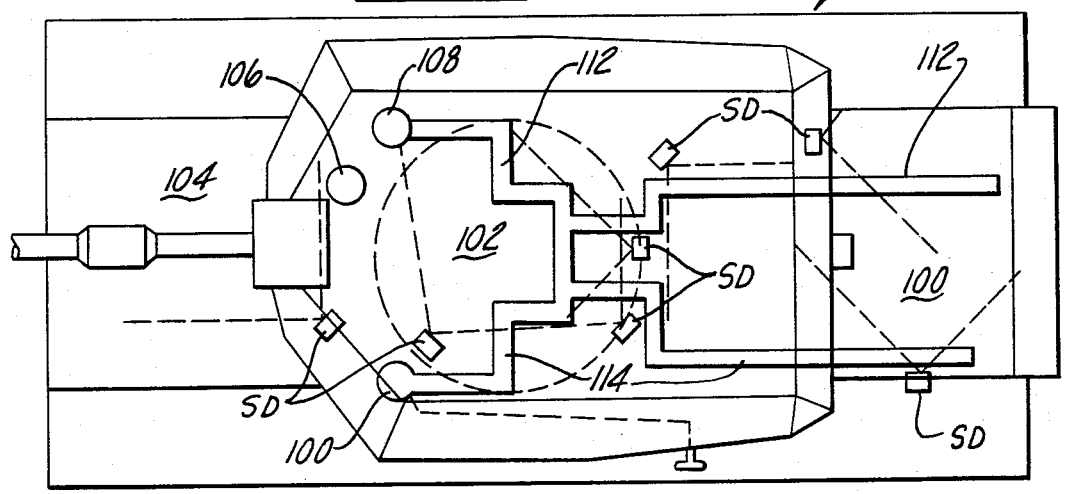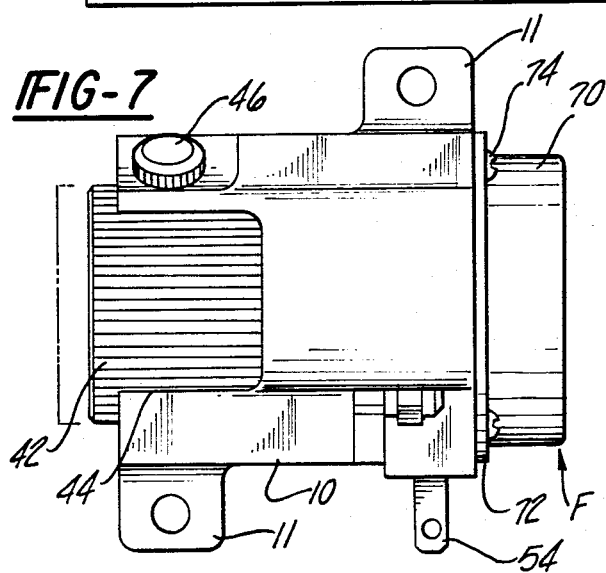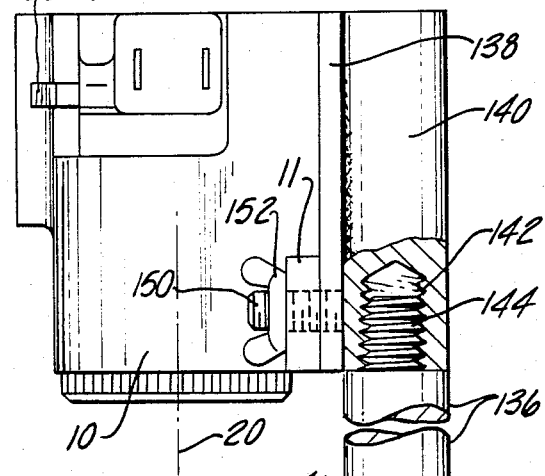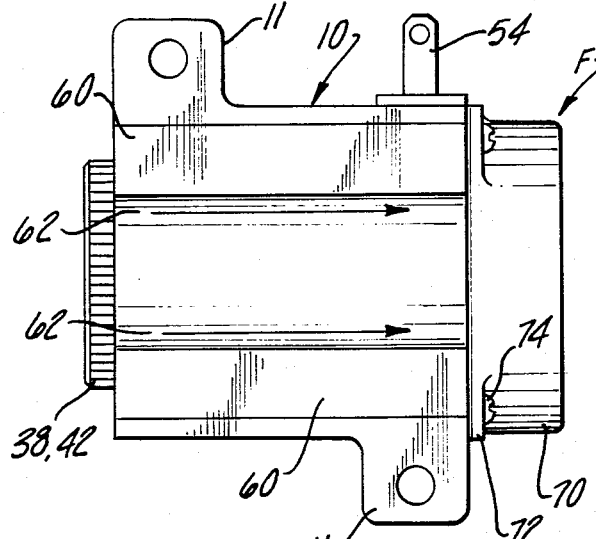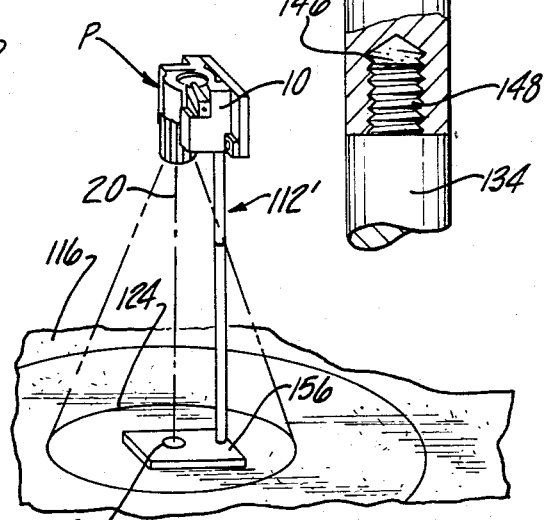

# 4,489,366

PORTABLE LIGHT-BEAM PROJECTOR LOCATING DEVICE, SYSTEM

GOVERNMENT INTEREST

The invention described herein may be manufactured, used, and licensed by or for the Government for governmental purposes without payment to me of any royalty thereon.

BACKGROUND OF THE INVENTION

This invention relates broadly to light ray or light-beam indicators, and more particularly to a small portable light-beam indicator of the projector type which generates a projected cone or beam of light used to help effect optimum placement of optical type fire-detection sensors, by simulating the normally invisible field-of-view of such optical sensors.

Because optical sensors do not emit a visible field-of-view or similar light source beam in a solid or uninterrupted three-dimensional pattern such as a cone, pyramid, rectangle, triangular or other suitable form, there is customarily required an exceptionally large amount of very accurate design layout effort to determine what usually proves to be a less than optimum location for the optical sensors.

For certain combat and tactical military vehicle applications, complete area or volume monitoring of an enclosure is required, and usually requires placement or mounting of several such optical type sensors. It is evident that the purpose of such sensors is to monitor and protect areas used by personnel as well as other equipment and/or data storage and work areas.

Thus the importance of evolving such a novel portable light-beam projector and system to assure strategic placement of such optical type sensors is quite apparent. It is believed to be further apparent that optimum location of such sensors is equally desired in conjunction with the installation of various intrusion and/or fire-suppression systems, whether of a military or civil commercial/industrial character.

Among the prior art there are known devices which utilize projected light beams in various ways as optical plumb levelers, line transferring devices, and visual imaging or light referencing system or area locators. Examples of such apparatus may be found in U.S. Pat. Nos. 3,858,984; 3,982,839; 3,988,837; and 3,854,820. The present invention differs significantly from these and all other devices of which I am aware.

OBJECTIVES AND BRIEF SUMMARY OF THE INVENTION

Thus, it is a principal objective of the present invention to devise a relatively simple portable light beam indicator or projector with an adjustable beam focusing shroud, not only to simulate various light cone angles corresponding to the normally invisible field-of-view (FOV) of various optical type sensor devices, but also to facilitate more expeditious optimum placement of such sensors in an area to be protected.

It is a further objective to provide a portable projector of the aforesaid character in some of its embodiments with suitable miniature cooling fan means particularly when using optionally higher wattage lamp bulbs therein.

Still a further objective is to evolve such a portable light projector device and related system apparatus including an angularly adjustable mounting bracket, and related calibrating standard and chart means, of which the overall novel system facilitates the expeditious locating/placement of optical type sensors.

The foregoing and other related objects and advantages are achieved by providing a light projector device comprising an open centered housing having the same general physical size, shape and other pertinent attributes as the sensor device to be installed. The light projector's housing has apertured external mounting lugs with aperture spacings corresponding to those of the optical sensor. The housing body embraces a tubular adjustable light shroud member which is movable relative to its self-contained but removable light source means. The common axis of the light source and shroud is to have a corresponding relationship to the axis of a field-of-view of the optical type sensor to be installed.

The light source means includes a light socket means having a light socket provided with an enlarged radially extended base flange which is provided with cooling apertures passing therethrough. For some embodiments, it is desired to combine a small cooling fan attachment rearwardly adjacent the socket's base flange to assure a positive flow of cooling air to be drawn in in through the tubular light shroud, passing through the apertures in the socket base flange and then outwardly through the open rearward end of the small cooling fan attachment.

These and other objects and advantages, including the evolved novel overall system and method of using the device for the improved installation of such optical type sensors, will become further apparent to one skilled in the art, when considered in conjunction with the following detailed description and accompanying illustrative drawing figures.

DESCRIPTION OF DRAWINGS

FIG. 1 is a generally three-quarter frontal perspective view from above of a preferred form of the assembled light beam projector invention, and is shown potentially associatable with a template-serving adjustable mounting bracket means which is used on selective installations;

FIG. 2 is a similar three-quarter perspective view from the rear of the basic assembled invention of FIG. 1, omitting the adjustable mounting bracket, but showing an optional detachable cooling fan means in detached relationship thereto, representing one modification thereof;

FIG. 3 is an exploded three-quarter rear perspective view of the basic light projector invention of FIGS. 1 and 2, to better show the inner components;

FIG. 4 is a horizontal cross-sectional detail view through the basic light projector device as viewed substantially on line 4—4 of FIG. 2, but with certain components shown at least partially in elevation form;

FIG. 5 is a front end elevational view of the projector device as may be viewed on line 5—5 of FIG. 4;

FIG. 6 is a fragmentary horizontal cross-sectional view generally similar to FIG. 4, but showing some of the components arranged in an altered relationship;

FIGS. 7 and 8 are top and bottom plan views respectively of the basic projector device of FIGS. 1 and 2, but which also show the optional cooling fan attached to the rearward portion;

FIG. 9 (adjacent to FIG. 2) is a much reduced scale frontal perspective view of one illustrative form of an optical sensor device to be positioned by use of the light projector inventive device hereof, it being apparent that the sensor's attributes and general housing shape have been closely copied in preparing the basic shape and component arrangement of the subject invention's light projector housing;

FIG. 10 is a diagrammatic top plan outline view of an exemplary military tank showing the needed locations therein of several of the optical type fire-detection sensor's relative to the also diagrammatically outlined fire suppression system for protecting the crew and engine compartments;

FIG. 13 is an enlarged fragmentary detail view partly in elevation and partly in cross section showing the light projector device attached to an upper portion of a support standard; and FIG. 14 is a reduced scale perspective view showing the light projector device mounted on a modified form of support standard, in conjunction with a fragmentary portion of the calibrating chart.

DESCRIPTION OF PREFERRED EMBODIMENTS

Figure 11:
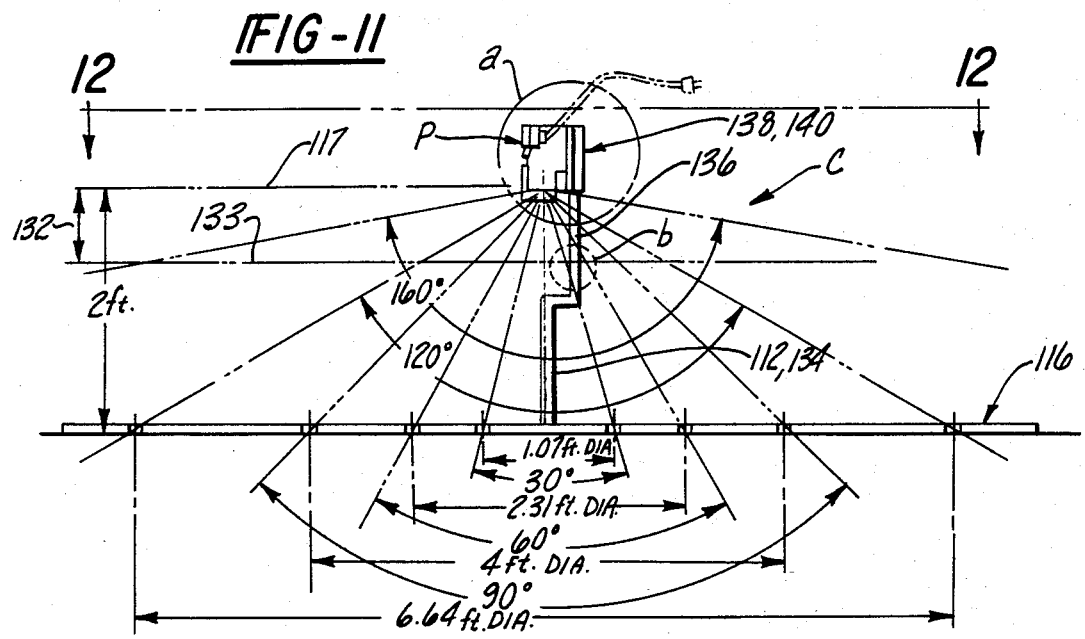
FIG. 11 is a semi-diagrammatic side elevational view of the light projector type sensor-locator-device hereof shown on a support stand in a calibrating relationship relative to a spreadout calibration chart.

Primarily referring to the illustrative drawing FIGS. 1–8, the basic portable light-beam projector means P comprises a housing body 10 made of a rigid plastic or other preferably non-metallic material. The body 10 is of generally cubical shape to correspond to the basic shape of a similar generally cubical shaped optical type fire or intrusion sensor device SD shown on greatly reduced scale in FIG. 9. Housing body 10 is provided with suitable mounting means which preferably are in the form of simulated mounting brackets or lugs 11, whose tentative template-serving apertures are spaced apart and arranged to correspond to those on a sensor device SD (FIG. 9) to be installed. Also the housing body 10 is provided with a generally cylindrical open center passageway 12, of which the forward major portion thereof is internally threaded at 14. Threaded portion 14 terminates internally at a shoulder 16 which also represents the terminal inner end of the non-threaded, slightly larger diameter portion 18 of the center passageway 12. The passageway has a central axis 20.

Adjustably mounted light source means, designated generally at 22, is removably mounted within the center portion 18 of the housing body 10. Light source means 22 more specifically includes a light bulb 24 which may have a bayonet or threaded base type for seating within socket portion 26 of socket body 28. Socket body 28 has a radially extending peripheral flange 30 of a diameter to enable it to have a close sliding fit within portion 18 of the housing body 10. The light bulb and socket are coaxially disposed with center axis 20 when assembled within the body 10. Except for the usual metal socket shell and/or electrical conductor portions, the socket and base are preferably made of a plastic-like dielectric material. To give this light source means some adjustable mounting features, spacer means is provided preferably in the form of an arcuate band 32 which selectively may be assembled either in front of the socket's peripheral flange 30, as seen in the cross-sectional detail of FIG. 4, or it may be assembled rearwardly of flange 30, as clearly shown in similar fashion in FIG. 6. The light source means and spacer band 32 are retained in their selected assembly mode by suitable retainer means such as snap ring 34 adapted to seat within a complemental annular body groove 36. It is contemplated that spacer bands of varying width may be used, but such a modification would further require corresponding additional snap ring grooves placed to provide the correct overall snug assembly of the components.

The light bulb generates a beam or cone of light to project from the front of the housing 10. Adjustable light beam focusing and/or projection means in the form of a tubular light beam adjusting shroud S is provided in conjunction with the body 10. Shroud S may be either a straight or slightly tapered metallic tubular body 38, preferably made of aluminum and is of a length approximately two-thirds the length of the housing body's center passageway 12. The tubular body 38 preferably terminates at its outermost end in a short inwardly turned transverse annular lip 39. Approximately the innermost one-third of the shroud body length is provided with male threads 40 which are sized to complemental mate with the female threads 14 of the housing. Any slight taper of the inside diameter of shroud body 38 would be toward its outermost end, and would contribute to reflect any stray light rays back inside the shroud. The inside surface of the shroud body also is preferably provided with a dull black finish, such as non-reflecting epoxy, to not only absorb the light better and minimize external reflections, but also to provide a more sharply defined cone of light being projected.

Alternatively to the complementally interengaging thread means to effect longitudinal adjustment of the shroud, it is contemplated that in lieu of the threads, the coacting members could be made to have a telescopic sliding fit and adjustment capability.

In the illustrative form, rotative adjustment of the shroud tubular body is facilitated by preferably having longitudinal striations or knurling 42 to be finger or thumb actuated when exposed through the access slot 44 cut into a side of the body 10. The striations 42 are preferred to be sufficiently course so as to serve as cooling fins, thereby helping to dissipate heat generated by long usage of the bulb. The selected adjustment of the shroud is then fixed by suitable means such as by a knurled-head lockscrew 46. Lockscrew 46 has a small area innermost end adapted to engage against the shroud body 38. This small end size of screw 46 reduces heat transferability. The housing body 10 is preferably beveled at 47 to better accommodate the lockscrew 46. Body 10 is further cutaway as appropriate to accommodate the side of the light source means containing the plug and switch means. Slot 44 additionally provides a good degree of cooling to the shroud and body members by better exposing more of the shroud body to the ambient environment/atmosphere.

Additional cooling features include the provision of a plurality of air passages 48 circumferentially disposed in socket flange 30. Preferably the air holes 48 are alternatively angled to better disperse convection currents toward greater areas of the respective housing and socket components. Still further cooling is contemplated by the optional provision of an add-on miniature cooling fan means F (FIGS. 2, 7 and 8) to be described hereinafter.

Light socket base or body 28 in FIG. 4 is shown provided with integral or unitary electric conductor line connection means represented by dotted conductor leads 50, 52 which connect either to known type corresponding terminals of a female receptacle (not shown) or of conventional known type plug means having prongs 54, as shown. Embodied therewith is a suitable on-off switch means represented by the exterior switch lever 56 and a diagrammatic make-and-break internal contact end 58, shown in broken lines in FIG. 4.

The aforementioned shroud and light means adjustment features assure capability of providing a wide angular range of solid cones of light to be projected. The projected light beams or cones of light will simulate the various fields-of-view built into various of the optical sensors (FIG. 9) to be installed in a given enclosure. The light bulbs are expected to be of very low wattage, and may be in various colors to facilitate easier identification of different predetermined ranges of the fields-of-view of the sensor devices.

Although the light bulbs will be of relatively low wattage, perhaps from 4 to 7 watts to minimize the build-up of heat, but still provide the necessary discernible light cone under somewhat darkened conditions, choice of the projector's materials and the overall design are important to better assure rapid conducting away by convection currents with or without auxiliary fan cooling. Thus, it is preferable that the materials have extremely poor heat conductivity and poor heat retention properties. As mentioned before, it is preferable that body 10 be fabricated of non-metallic material except for the magnetic mounting means, one form of the latter being here illustrated as soft iron magnets 60, suitably attached to the housing 10 by means of an adhesive, or flat-head screws (not shown).

In the underside of the housing body 10 in which the magnets 60 are recessed, the body is preferably cutaway in the areas designated 62, 62 to thereby provide additional cooling channels along the underside when it is mounted on a supporting surface.

Typical light bulbs may be of the 4 to 7 watt, small, "night light" type which are commercially available in red, blue, green or yellow, as by Westinghouse Electric Corporation, items DBBC7. This type of bulb is only slightly tinted, enabling one to see the filaments through the bulb of an unlit light. These lights are deemed to provide effectively discernable light beams in darkened small rooms, compartments or alcoves of rooms, etc. From observing FIG. 4, various angled cones of light are illustrated ranging from 30° up to 120°. The 90° cone is the one most frequently used in effecting the installation of the optical sensors. Occasionally a cone angle of 160° may be required, which is achievable by the altered arrangement as per FIG. 6, to be described hereinafter.

It is contemplated that white, yellow and possibly the blue tinted lights would be used in medium sized compartments or areas. For much larger volume areas, light bulbs of higher wattage and more efficient lamp design with attendant reflector and/or cooling fan means will be utilized, the latter to provide a forced flow of cooling air.

In this latter regard, the briefly hereinabove mentioned fan means F is preferably used in conjunction with the portable projector means P. In FIG. 2, the fan means F is merely illustrative of some miniaturized form of fan assembly. It preferably includes an annular housing 70, a radial mounting flange 72, suitable fastener means 74, and a motor and fan blade assembly 76 suitably centrally supported therein as by spider arms 78. Suitable electrical conductor wires leading to and from the motor preferably have any suitable form of terminal jacks 80 (FIG. 2) which are adapted to functionally mate with corresponding female receptacle holes 82 (FIG. 2) shown in conjunction with the integral plug means of the light source means 22. It is intended that the wiring will be integrated so that when the light switch lever 56 is switched to its "on" position, the fan motor will be also energized to rotate the fan blade. The blades are angled preferably so as to effect a noticeable positive pull of cooling air in through the front of the shroud S, the air flow being shown in FIG. 2 by the arrows 84. It is apparent that the cooling air will flow over and around all component parts and will pass through the aforesaid cooling holes 48 in the socket body 28, then out rearwardly through the fan housing to ambient atmosphere.

USE OF AUXILIARY ANGLE BRACKET MEANS

It should be quite apparent that the placement determinations of many of the optical type sensor devices SD are more effectively achievable by the sole use of the novel portable light-beam projector means P, as described hereinabove; that is, by the template-like placement of the projector means directly onto a planar portion of a support surface such as on ceilings, walls, or floors and the like, while simultaneously evaluating the cone-of-light projected therefrom. However, it should also be apparent that certain other placement determinations require the mounting of the sensor devices on an angle relative to an adjacent planar support surface. Most frequently the angular mounting will vary somewhere between 0° and 90° normally found between many adjacent structural components, such as walls, ceiling and floors, or the like.

To facilitate such angular placement determination, an auxiliary template-serving, portable angle bracket means B is used in conjunction with the portable light projector means P. Reference to FIG. 1 shows this relationship which is in a slightly exploded/separated manner for clarity. Describing the portable angle bracket means B of FIG. 1, it is seen to comprise two angularly adjustable, hinge-like, pivotally connected mounting plates 86 and 88, which constitute bottom and top plates respectively. Although the plates 86 and 88 are depicted as being basically of rectangular shape, at least the top plate 88 need only be of a size and shape as to include rigid interconnected projector-support-areas 90 and 92. Top plate 88 preferably has at least a top surface which is magnetically attractable, preferably being iron or steel. Said plate 88 also preferably has a pair of spaced-apart holes 93, 93 for receiving potential fasteners such as screws 94, 94 to secure the projector means P thereon. Although the magnets 60 will serve to hold the projector means P onto the bracket plate 88 without use of the screw fasteners 94, it may be preferable to use such orienting screws 94, 94 in order to avoid misorientation by any undesired possible shifting during the template-like placement activity.

Bottom hinge plate 86 is shown preferably to have the same basic shape, size and hole locations 93', 93', as that of top plate 88. However, its size also may vary, but it should be either of a size corresponding to the size of an actual angular mounting bracket base plate, or have mounting apertures corresponding to potential mounting apertures in such an angular bracket's base plate. Thus, after placement determination has been made, either an outline tracing of the bottom plate 86 can be made upon a potential mounting surface, or hole-center locations can be marked thereon in a template-like fashion, from which an actual angular mounting bracket can be correctly located after it has been fabricated.

To further facilitate the proper optimum placement or mounting of actual angular mounting brackets, the template-serving bracket means B further may be provided with some form of magnetic means 95 to provide for a temporary mounting upon a magnetically attractable surface. The magnet means 95 may be in the form of an adhesively applied magnetic layer, either of rigid or semi-flexible character. This may be of the type used in the manufacture of magnetized emblems and logos. One company making and/or distributing such a product is RAM ENTERPRISES, Box 385 Christy Road, Eighty Four, Pa. 15330 (412-222-7420). As an alternative to the use of magnetic means, suitable resilient suction cup means (not shown) may be used to secure temporary mounting at least of the adjustable bracket means.

Bracket means B also includes lock means L to effect temporary angular locking of the two hinge-like plate members 86 and 88. The lock means L may be of any suitable means such as a slotted arm 96, which is preferably of arcuate, calibrated form, together with the co-operative lock nut or lock screw 98. Lock means L is further disposed so as not to project beyond the outermost dimension of the mounting lugs 11, or equivalent area on upper plate 88, and also so as not to be interferred with by the projector's housing body 10 regardless of the brackets relative angular disposition. The calibrated character of the arm is to ascertain a determined relative angular disposition of plates 86 and 88, so that a corresponding angled actual mounting bracket can be fabricated for ultimate mounting of one of the sensor devices in that selected area of a vehicle or other type enclosure.

Relative to the aforementioned mounting holes 93', 93' in the bottom plate 86, while they are shown to correspond to the locations of the other holes 93, 93 in top plate 88, they need not be so located; alternatively they may comprise a pair of laterally, vertically, or otherwise diagonally disposed apertures. Said apertures 93', 93' are preferably countersunk for potential use therewith of flat head screw fasteners (not shown).

It is apparent that the aforedescribed portable adjustable bracket means B does act as a desirable auxiliary template-serving, placement-locating device to better facilitate optimum angular mounting of certain of the sensor devices. Some of these angular placement mountings are frequently required for placement of the optical type fire-detection sensor devices in conjunction with fire-suppression systems installed in various types of military fighting vehicles. One illustrative example of this is depicted in the top plan diagrammatic representation of a military tank T shown in FIG. 10. Therein several optical-type fire-monitoring sensor devices SD are shown in conjunction with the engine compartment 100, and with the crew compartments 102 and 104.

These compartments are provided with a highly effective fire-suppression system commonly embodying quick-acting fluid-dispensing nozzles disposed throughout the vehicle. The fire-suppressing fluid, which may be Halon-1301, is preferably stored in suitable supply source tanks schematically shown at 106, 108 and 110 in FIG. 10. Dispensing or distribution conducts 112 and 114 are functionally tied in with the tank sources 108 and 110, and the system is programmed to dispense fire-suppressing fluid instantaneously upon optical detection by the sensor devices SD of an outbreak of fire coming within the effective field-of-view of the installed sensor devices. The term Halon, as used above, is a blend or contraction of halogenated hydrocarbon, used in making the fluid.

CALIBRATION CHART MEANS

The full, cone-shaped field-of-view of various types of optical sensor devices can be simulated by the novel portable light projector's light beam. Depending upon the type and form of light bulb and its filaments, which light bulbs may be of one known form of night light which is commercially available, the shape of the light beam emitted or projected will vary. The shape of the projected light beam must be of full or solid conical form measurable in sterads or steradians. For example, a 90° cone will have a $\pi/2$ steradian measurement; and, the angularity of the cones-of-light should be adjustable from at least 30° up through 120°, and possibly up to 160°. This range of angular adjustments is achieved primarily by use of the aforedescribed adjustable shroud S. It is therefore apparent that the various portable light-beam projectors must be calibrated to assure uniform projection of the predetermined angled cone-of-light representative of the particular field-of-view cone of the sensor to be installed. Accordingly, suitable calibration means C have been evolved and will now be described.

Calibration means C as depicted in the illustrative drawings (FIGS. 11-14) generally comprises co-acting projector support stand means 112 and calibration chart means 114. Chart means 114 comprises a preferably flexible sheet member 116 fabricated of a durable canvas, plastic, or reinforced fiberglass cloth material, or the like. It may be of large rectangular form, or of generally circular form, indicated by the arcuate line 118. A plurality of concentric arcuate, preferably circular, calibrating chart lines are suitably imprinted upon the collapsible or flexible sheet around its centerpoint 120 (FIG. 12), when in the opened flat condition. A small diameter circle 122 may be applied around the centerpoint 120, to represent a positioning base upon which to orient the support stand means 112, which will soon be clarified.

The plurality of circles, or partial circle indicia which include at least substantial portions of diametrically opposed segments thereof, are representative of base circles of the differently angled cones-of-light projected down onto the sheet member 116 at substantially right angles thereto from a predetermined height of the projector means P. The predetermined height is indicated by the distance between the sheet member 116 and line 117 in FIG. 11. The projector means P may be hand held alone, or more preferably hand stabilized while being supported at least partially by the support stand means 112 at the chosen height of two feet, as per FIG. 11. At this two foot height from which the various angled cones-of-light will be projected onto the chart sheet 116, the different circle form base diameters of the respective light cones shining upon the sheet 116 can be computed and/or fully or partially outline imprinted onto said sheet, together with their suitable accompanying identification and use instruction indicia. Reference to FIG. 12 shows these circles and related indicia, wherein the circle denoted 124 represents the base of a 30° angled cone-of-light, the circle 126 represents the base of a 60° angled cone-of-light, the circle 128 represents the base of a 90° angled cone-of-light, and circle 130 primarily represents the base of a 120° angled cone-of-light from the said two foot height. The same circle 130 also secondarily simultaneously can be representative of the base of a less frequently used 160° angled cone-of-light. It would be measured from a much lesser height, for example, from the approximate 6.4 inch height indicated by the reference character 132 between line 117 and line 133. The line 133 would be indicative of an alternate support surface upon which chart 116 would be deployed when calibrating a projector means for the potential 160° angled cone-of-light.

The aforesaid circular line indicia have corresponding related identifying and use instruction indicia; for example, circle 128 has the indicia "90°—use both posts", and circle 130 has dual sets of indicia, i.e. "120°—use both posts", and "160°—use short post". The meaning of the phrase indicia will become apparent from further detailed description hereinafter.

Figure 12:
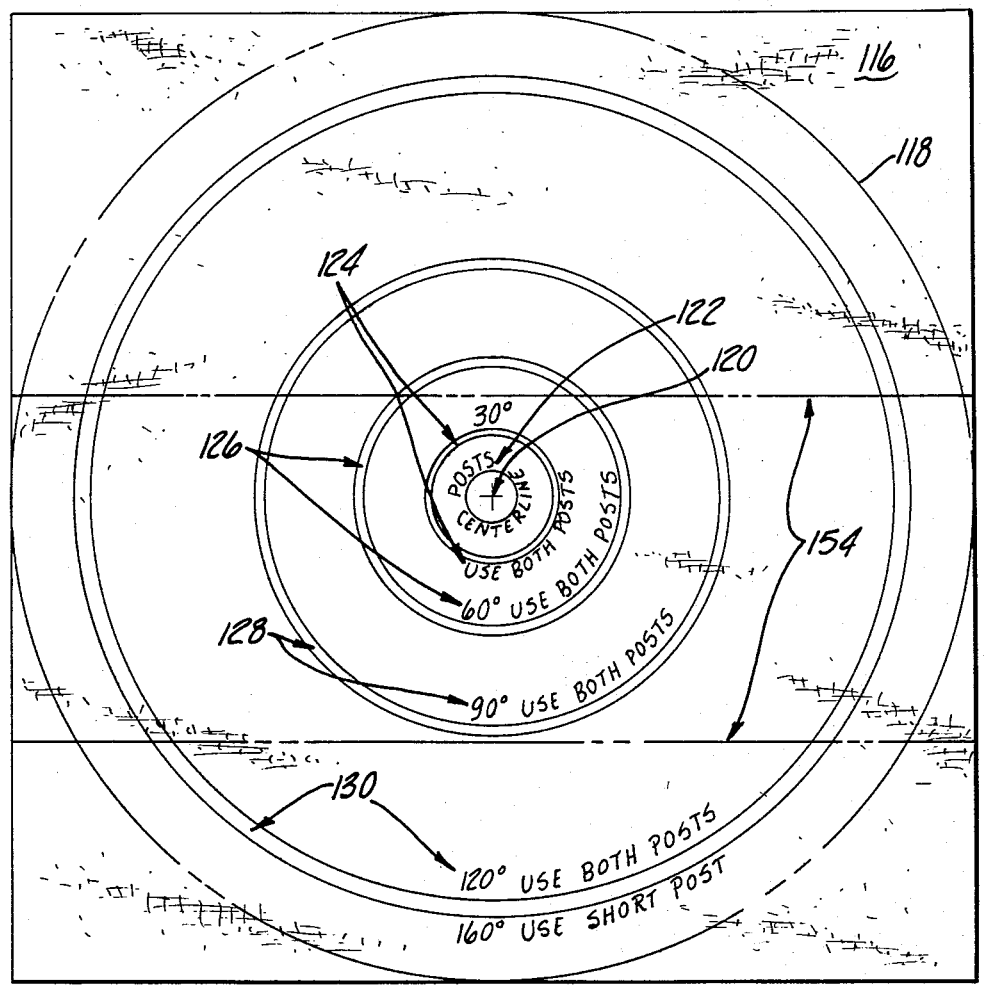
FIG. 12 is a top plan view of a fragmentary major portion of a calibrating chart as used in FIG. 11, as viewed from the line 12—12, but omitting the light projector and support stand.

The corresponding different angular cones-of-light and their base circle locations upon sheet 116 are also clearly shown in the related FIG. 11. This same figure shows the respective diameter dimensions for each base circle of the illustrated differently angled cones-of-light. Additionally, the support stand means 112 therein now will be described in more detail as better seen in FIGS. 11 and 13.

Stand means 112 comprises a multiple part support post of which the lowermost section 134 may be of generally crank shape, including two offset vertical portions unitarily connected by a short horizontal portion. The amount of offset is such as not only to enable the lowermost end to be centered upon the chart's centerpoint 120 and its base circle 122, but also so as to assure that the axis 20 of the projector means P is perpendicularly centered upon the centerpoint 120. The lowermost end of section 134 optionally may be centrally drilled out to accept a friction-fit or threaded removable pin (not shown). Such a pin would facilitate center locating by punching of the pin through the centerpoint 120 in instances where the calibrating sheet member 116 may be deployed upon relatively soft earth or equivalent semi-resilient surface. The upper post section 136 is preferably of shorter length corresponding to the height designated 132 between said lines 117 and 133 (FIG. 11). This post section 136 is adapted to be used by itself when calibrating one of the portable projector means P to have the much broader light cone angle of 160°. Upper post section 136 is of predetermined height so that a potential cone-of-light projected at a 160° angle will intersect the calibrating sheet 116 at essentially the same diameter circle or arcuate indicia 130 as that for the 120° cone-of-light. It therefore becomes apparent the need for the aforementioned two sets of indicia relative to the use of either "both" posts or only the "short" post section (FIG. 12).

When a wide angled 160° cone-of-light is needed, the arrangement of the light socket body 28, and spacer 32 as shown in FIG. 6 will be used. This will enable the light bulb 24 to project further forward relative to the outermost end or lip 39 of the adjustable shroud S, whereupon a much wider angled cone-of-light can issue, especially with shroud S retracted or removed.

Further exemplary details of the encircled areas a and b shown in FIG. 11 relating to the upper portion of the support stand means 112 can be better seen in FIG. 13. This uppermost portion preferably includes a metallic base or mounting plate 138 which may be a magnet or of at least partially magnetically attractable material on the face upon which the base portion of the portable projector means is to be temporarily mounted. The rear face of plate 138 is attached unitarily to a suitable base portion 140, the lower end thereof preferably being internally threaded at 142 to accept a complementally threaded stud 144 provided on the upper end of the short post section 136. The lowermost portion of short post section 136 is preferably similarly internally threaded at 146 to also accept a complementally threaded stud 148 provided on the upper end of the lower and longer post section 134.

Although the portable projector means P is adapted to be temporarily magnetically attached to the posts mounting plate 138, in order to better assure the correct orientation thereof and of the projector's axis 20, base plate 138 is provided preferably with two threaded studs 150, 150 spaced apart to accept the apertured mounting lugs or flanges 11, 11 of projector housing 10. Projector means P may be further secured to the post mounting plate 138 by means such as wing nuts 152 (FIG. 13), or the like.

The flexible calibration sheet 116 is adapted to conform, if necessary, to any irregular terrain upon which it is deployed, although it is apparent that truer readings will be obtained when it is spread upon an essentially flat support surface. As previously stated, to conserve the overall chart size, or to compensate for portions which may lay distortedly upon irregular terrain, it is not necessary to have completely full 360° circular line indicia, as long as substantial diametrically opposed arcuate portions are functionally effective upon which to measure/calibrate a cone-of-light beam. A diminished portion or size of the chart may be comprised of the area between parallel lines denoted 154 in FIG. 12.

FIG. 14 is a perspective representation of a slightly modified support stand means 112' which preferably uses a straight or aligned two-part post, in conjunction with a base support plate 156 adapted to be set upon a substantially flat support surface. The base support plate 156 may have a generally centered aperture 158 whose center will correspond to register with the projector's axis 20, to help assure its requisite essentially 90° orientation relative to the calibration chart. It is understood that the calibration chart means is used only to calibrate the portable light projectors within predetermined acceptable limits, some of which may be represented by the slightly varying widths of the circular or arcuate line indicia 124, 126, 128 and 130. These are shown to progressively widen with the progressively larger diameter measurements thereof.

From the foregoing description, it is apparent that the novel portable projector means in conjunction with the overall described system's components, achieves all of the objectives and advantages set forth in the preamble and throughout the full application. One of the most important advantages is the elimination of the previous necessarily empirical character of determining the placement of such optical detectors. In other words, the former so-called trial-and-error approach never seemed to achieve anything better than a usually poor approximation and could not truly scientifically determine optimum locations with proper consideration of occupants or cargo and the like. These errant approximations repeatedly failed during the field-fire-tests, thus necessitating relocation by way of further trial-and-error testing. Additionally, some of the errant approximate locations would result in false alarms being generated from the peripheral flash of large bore gunfire. Even where so-called highly trained personnel installed the sensor devices, it still frequently entailed much guess-work, which required attempted verification by complex, three dimensional design computation and layout drawings for each type of sensor installation. Such design studies and layouts could not truly include inherent tolerance variation studies which would necessarily only further complicate the verification study. Furthermore, even where a layout evolved into what was thought to be error free, it never was truly considered so because of intangible factors of obstacle blockage of portions of the field-of-view by moving personnel or differently placed or shifted cargos/equipment, and the like. Accordingly, the prior practice relative to many military vehicles did not even attempt to include such verification layout studies and drawings. This practice thus resulted in expensive subsequent changes after discrepancies evolved from actual field tests, with such changes relating not only to actual replacement of hardware, but also relative to attendant training and maintenance manuals.

The novel locator device or article, the attendant system apparatus, and the related novel improved method of determining optimum placement of such optical type sensors, collectively and individually present a much needed and markedly improved advance in the art. The inventions hereof can pertain to variously shaped commercially available optical sensors some of which are manufactured or marketed by companies such as Spectronix, Grumman, Fenwal, Systron-Donnor, Santa Barbara Research Center, McGraw-Edison, and others.

While the inventions, and inventive facets hereof have been described with regard to certain best and alternative mode specific details, it is apparent that still other variations and modifications may be made by those skilled in this art without departing from the spirit and scope of the substantive concepts hereof as defined in the appended claims.

I claim:

1. A device for use in determining the optimum location and coverage of optical detection devices to be installed on surfaces defining a volume to be monitored so as to ensure complete coverage of the volume to be monitored, said device including:

a projector housing including, a body corresponding generally to the configuration of the optical sensor to be installed at a specified location, said housing having a generally cylindrical passageway, and said housing having associated therewith a bracket template adapted to define a location at which mounting apertures are to be located in the surfaces defining the protected volume;

a light source located within the cylindrical passageway.

a light beam shroud mounted coaxially with said cylindrical passageway said shroud being adapted to move longitudinally relative to said cylindrical passageway so as to vary the cone of light cast by the light source; and adjusting means for moving said light beam shroud between first maximum cone of light position and second minimum cone of light positions, said adjustment means having means associated therewith to hold the light beam projected from the shroud in a position corresponding to the volume protected by the optical detector to be installed.

2. The device of claim 1, wherein said projector housing bracket template is provided with magnetic means to facilitate temporary mounting of the projector device on a magnetically active surface.

3. The device of claim 1, wherein said light beam shroud is provided with a dull black colored interior surface to minimize external light reflections and project a more sharply defined light cone.

4. The device of claim 1, wherein said light beam shroud has on its external surface longitudinal heat dissipating fins.

5. The device of claim 1, wherein said light source has associated therewith spacer means and retainer means associated with the light source and projector housing to adjust the position of the light source within the cylindrical passageway thereby providing a means for adjusting the light cone projected by the device.

6. The light-beam projector device of claim 5, wherein said spacer means comprises an arcuate flat band member located within the projector housing and the retainer means is a snap ring seated in a complementary annular groove in the body.

7. The system of device 1, further comprising an adjustable bracket means with first and second plates, pivotally connected along one edge, said plates having an adjustable locking means associated therewith to temporarily hold said plates in a selected angular relationship, said first plate being adapted to accommodate the temporary mounting thereon of said bracket template and said second plate being formed in the shape of a mounting flange to be used in mounting a permanent bracket on said surfaces.

8. The device of claim 7, where said adjustable bracket is provided with magnetic means to facilitate mounting on a magnetic surface.

* * * * *